United States Patent Office 3,218,365
Patented Nov. 16, 1965

3,218,365
ALKYLATION OF FULVENE COMPOUNDS
Henry E. Fritz and David W. Peck, Charleston, W. Va., assignors to Union Carbide Corporation, a corporation of New York
No Drawing. Filed Sept. 10, 1962, Ser. No. 222,693
5 Claims. (Cl. 260—666)

This invention relates to the alkylation of fulvene and fulvene derivatives. More particularly, this invention relates to a process for the alkylation of fulvene and fulvene derivatives which comprises reacting fulvene or a fulvene derivative with a secondary alcohol in the presence of a highly alkaline metal hydroxide.

According to the process of the instant invention, fulvene or a fulvene derivative is reacted with a secondary alcohol in the presence of a highly alkaline metal hydroxide, such as potassium hydroxide or sodium hydroxide. Surprisingly, the unsaturated carbon atom which is outside the ring of the fulvene compound is converted to a saturated carbon atom and the compound is further alkylated with the secondary alcohol to produce a mixture of dialkylated and trialkylated cyclopentadienes. Even more surprising is the fact that none of these alkylated cyclopentadienes contain any substitutents attached to the 5 position as in the starting fulvene compound.

The fulvene derivatives employed as starting materials can be depicted by the general formulas:

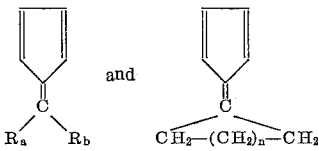

wherein $R_a$ and $R_b$ are radicals selected from the group consisting of hydrogen and alkyl radicals having from 1 to 10 carbon atoms, preferably from 1 to 8 carbon atoms; and $n$ is an integer having a value of from 0 to 10, preferably from 2 to 4. Illustrative of such starting materials are such compounds as fulvene, 6,6-dimethylfulvene, 6,6-diethylfulvene, 6,6-dipropylfulvene, 6,6-dibutylfulvene, cyclohexylidenecyclopentadiene, 6,6-dioctylfulvene, 6,6-didecylfulvene, and the like.

The secondary alcohols employed as starting materials can be depicted by the general formulas:

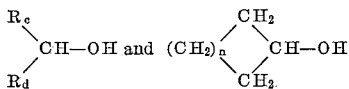

wherein $R_c$ and $R_d$ are hydrocarbon radicals free of aliphatic unsaturation, including alkyl and aryl radicals, said radicals having from 1 to 10 carbon atoms, preferably from 1 to 8 carbon atoms; and $n$ is an integer having a value of from 0 to 10, preferably from 2 to 4. Illustrative of such starting materials are such compounds as isopropanol, 3-ethyl-2-pentanol, 3-ethyl-2-octanol, 5-ethyl-2-nonanol, cyclopentanol, cyclohexanol, cycloheptanol, 1-phenylethanol, and the like.

The products produced by the process of the instant invention can be represented by the formulas:

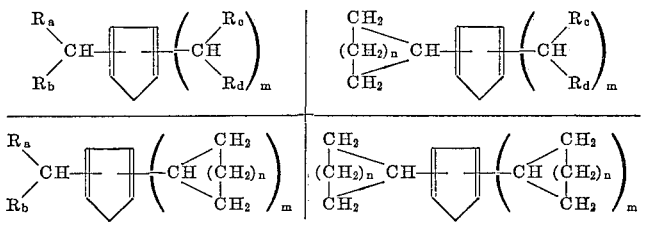

wherein $R_a$, $R_b$, $R_c$, $R_d$, and $n$ are as above defined, and $m$ is an integer having a value of from 1 to 2.

In order to effect reaction between a fulvene compound and a secondary alcohol according to the process of the instant invention, the presence of a highly alkaline metal hydroxide, or other strongly alkaline material, in the reaction mixture is necessary. The metal hydroxide is preferably selected from the group consisting of sodium hydroxide and potassium hydroxide, although any other highly alkaline metal hydroxide, such as rubidium hydroxide or cesium hydroxide, can also be employed. The metal hydroxide can be employed in an amount from as low as about 0.01 mole percent to as high as about 200 mole percent, preferably from about 5 mole percent to about 50 mole percent, of the fulvene compound employed, or the hydroxide can be employed in strictly catalytic amounts if desired. Amounts of the metal hydroxide of from about 0.01 mole percent to about 20 mole percent, preferably from about 0.1 mole percent to about 5 mole percent, of the fulvene compound employed, are completely satisfactory.

When effecting reaction according to the process of the instant invention, it is preferable to employ a substantial excess of alcohol over the stoichiometric amount required in order to effect complete reaction of the more expensive fulvene compound. Amounts of alcohol of from about 1 to 10 times the stoichiometric equivalent are preferred for this purpose, but amounts of from as little as 0.1 mole to as much as 100 moles of alcohol per mole of fulvene compound present can also be employed. When an excess of alcohol is employed, the alcohol acts as a solvent as well as functioning as a reactant.

The process of the instant invention may be conducted in a batchwise or continuous manner. When a batch procedure is employed, reaction is usually effected in a closed system under autogenous pressure. When the process is conducted continuously, the reactants are usually fed through a pressurized reactor. In general, whether the process be conducted continuously or in a batchwise manner, the pressure can range from as low as about 100 p.s.i. to as high as about 10,000 p.s.i., with the most suitable pressures ranging from about 1,000 p.s.i. to about 5,000 p.s.i.

Reaction according to the process of the instant invention readily occurs at temperatures ranging from as low as about 210° C. to as high as about 330° C., but is preferably effected at temperatures ranging from about 250° C. to about 290° C.

The reaction time is not narrowly critical, but longer reaction times usually result in greater yields of the trialkylated product as compared to the dialkylated product, provided other reaction conditions are kept constant. Reaction times of from about 0.5 to about 10 or more hours, preferably from about 1 to about 2 hours, are satisfactory for batch operations. When the reaction is conducted continuously, the rate of flow of the reactants through the reactor is preferably regulated so that from about 0.5 to about 100, most preferably from about 5 to about 40, liters of reaction mixture per liter of reactor volume pass through the system each hour. The ratio of the liters of reaction mixture to liter of reactor volume passing through the system in one hour is known as the liquid hourly space velocity.

The products produced by the process of the instant invention can be recovered from the reaction mixture by conventional techniques. These products can be hydrogenated to produce high temperature fuels, while their sodium salts can be treated with ferric salts to produce sandwich-type compounds which are used as antiknock agents in gasoline. These compounds can also be epoxidized, polymerized, and used as intermediates for a whole host of new chemical compounds, as is obvious to one skilled in the art.

The following examples are set forth for purposes of illustration so that those skilled in the art may better understand this invention, and it should be understood that they are not to be construed as limiting this invention in any manner.

*Example I.—Alkylation of 6,6-dimethylfulvene with isopropanol*

A sixteen-foot length of coiled stainless steel tubing having an inner diameter of $3/16$ inch and a volume of 60 cc., along with an attached receiver, was pressurized to a pressure of 4,000 p.s.i. at a temperature of about 250° C. After a pre-run feed was fed through the tubing, a solution of 116 grams (1.1 moles) of 6,6-dimethylfulvene in 1,386 grams of a solution of 4.3 percent by weight of potassium hydroxide in isopropanol (1.05 moles) was fed to the system at a liquid hourly space velocity of 6.1 while the temperature and pressure were maintained constant. About 1,366 grams of liquid reaction product were recovered. This product was washed with water, with hexane being added to dissolve the aqueous-insoluble product. The hexane was removed from the water-insoluble product by distillation at atmospheric pressure, and the residue was distilled under reduced pressure. About 82 grams of diisopropylcyclopentadiene (0.55 mole) were collected. This represented a yield of 50 percent of theoretical.

A crude fraction of triisopropylcyclopentadiene was also obtained by the distillation. When this product was redistilled, about 32 grams (0.167 mole of pure triisopropylcyclopentadiene were obtained. This represented a yield of 15 percent of theoretical. This product had a boiling point of 84° C. at 6 mm. Hg pressure and an index of refraction of 1.4771 at 20° C.

The two products were identified by infrared, ultraviolet, and nuclear magnetic resonance studies, as well as by chemical analysis.

*Example II.—Alkylation of 5-cyclohexylidenecyclopentadiene with isopropanol*

The procedure of Example I was repeated employing a solution of 95 grams of 5-cyclohexylidenecyclopentadiene in 984 grams of a solution of 4.3 percent by weight of potassium hydroxide in isopropanol at a liquid hourly space velocity of 6.5. About 962 grams of liquid reaction product were recovered. The product was washed with water, with hexane being added to dissolve the aqueous-insoluble product. The hexane was removed from the water-insoluble product by distillation at atmospheric pressure, and the residue was distilled under reduced pressure. When the distillate was redistilled, about 25 grams (0.13 mole) of cyclohexylisopropylcyclopentadiene and 15 grams (0.065 mole) of cyclohexyldiisopropylcyclopentadiene were collected.

The yield of cyclohexylisopropylcyclopentadiene was 20 percent of theoretical and the yield of cyclohexyldiisopropylcyclopentadiene was 10 percent of theoretical. The two products were identified by infrared, ultraviolet, and nuclear magnetic resonance studies as well as by chemical analysis. Cyclohexylisopropylcyclopentadiene had a boiling point of 110° C. at 6 mm. Hg pressure and an index of refraction of 1.4975 at 20° C. Cyclohexyldiisopropylcyclopentadiene had a boiling point of 127° C. at 5 mm. Hg pressure and an index of refraction of 1.5038 at 20° C.

In like manner, dicyclohexylcyclopentadiene and tricyclohexylcyclopentadiene are produced when 5-cyclohexylidenecyclopentadiene is reacted with cyclohexanol. The reaction proceeds in the same manner when sodium hydroxide is substituted for potassium hydroxide.

What is claimed is:

1. A process for producing compounds represented by the formulas

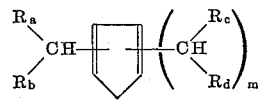

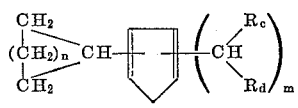

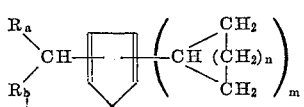

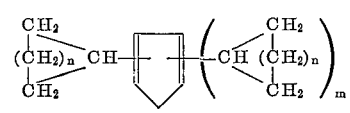

wherein $R_a$ and $R_b$ are radicals selected from the group consisting of hydrogen and alkyl radicals having from 1 to 10 carbon atoms, $R_c$ and $R_d$ are hydrocarbon radicals free of aliphatic unsaturation having from 1 to 10 carbon atoms, $n$ is an integer having a value of from 0 to 10, and $m$ is an integer having a value of from 1 to 2, which comprises reacting a fulvene compound selected from the group consisting of fulvene compounds represented by the formulas

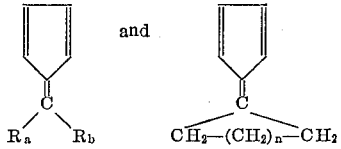

wherein $R_a$, $R_b$, and $n$ are as above defined, with a secondary alcohol selected from the group consisting of alcohols represented by the formulas

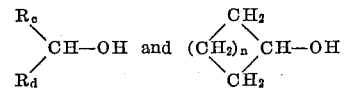

wherein $R_c$, $R_d$, and $n$ are as above defined, in contact with a member selected from the group consisting of sodium hydroxide and potassium hydroxide.

2. A process for producing compounds represented by the formula

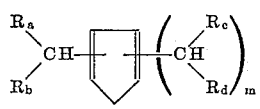

wherein $R_a$ and $R_b$ are radicals selected from the group consisting of hydrogen and alkyl radicals having from 1 to 10 carbon atoms, $R_c$ and $R_d$ are hydrocarbon radicals free of aliphatic unsaturation having from 1 to 10 carbon atoms, and $m$ is an integer having a value of from 1 to 2, which comprises reacting a fulvene compound represented by the formula

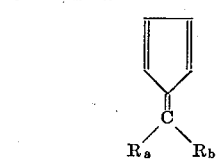

wherein $R_a$ and $R_b$ are as above defined, with a secondary alcohol represented by the formula

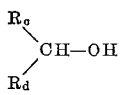

wherein $R_c$ and $R_d$ are as above defined, in contact with a member selected from the group consisting of sodium hydroxide and potassium hydroxide.

3. A process for producing compounds represented by the formula

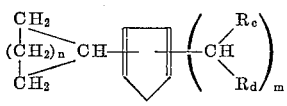

wherein $R_c$ and $R_d$ are hydrocarbon radicals free of aliphatic unsaturation having from 1 to 10 carbon atoms, $n$ is an integer having a value of from 0 to 10, and $m$ is an integer having a value of from 1 to 2, which comprises reacting a fulvene compound represented by the formula

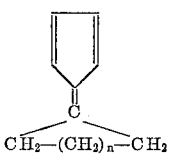

wherein $n$ is as above defined, with a secondary alcohol represented by the formula

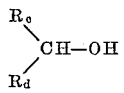

wherein $R_c$ and $R_d$ are as above defined, in contact with a member selected from the group consisting of sodium hydroxide and potassium hydroxide.

4. A process which comprises reacting 6,6-dimethylfulvene with isopropanol in contact with a member selected from the group consisting of sodium hydroxide and potassium hydroxide.

5. A process which comprises reacting 5-cyclohexylidenecyclopentadiene with isopropanol in contact with a member selected from the group consisting of sodium hydroxide and potassium hydroxide.

No references cited.

ALPHONSO D. SULLIVAN, *Primary Examiner.*